May 22, 1934.  F. M. VENZIE  1,959,511
CEMENTITIOUS CONDUIT
Filed Aug. 4, 1931
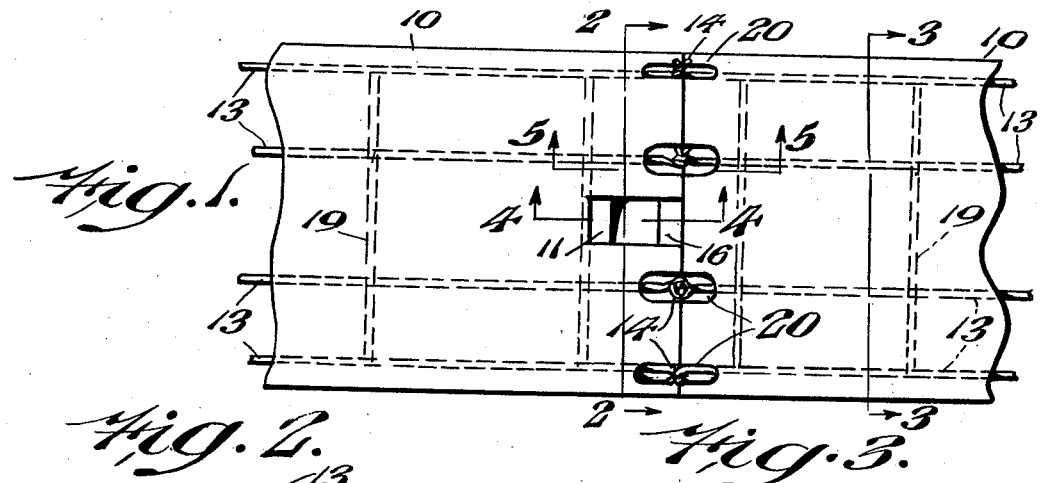
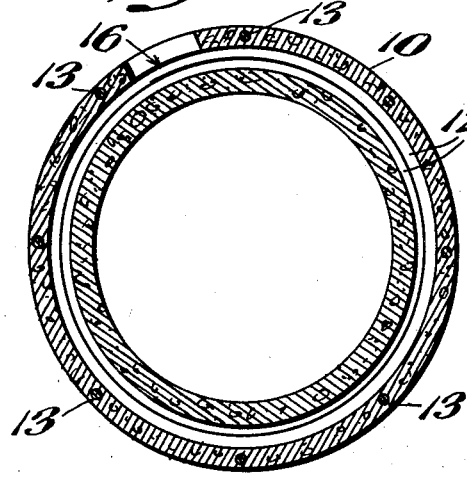
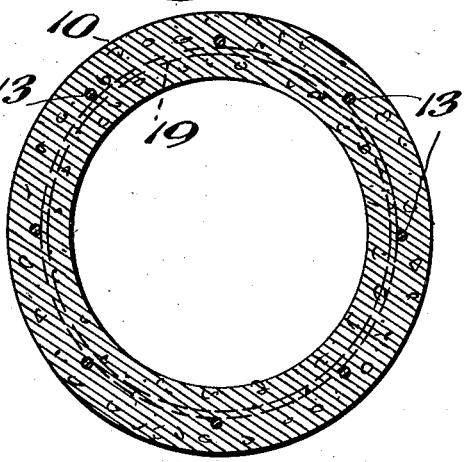
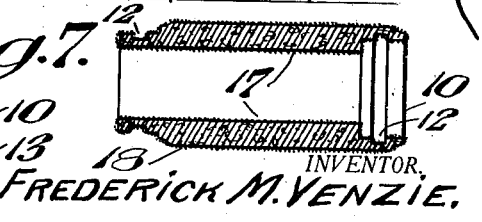
INVENTOR.
FREDERICK M. VENZIE.
BY
ATTORNEY.

Patented May 22, 1934

1,959,511

UNITED STATES PATENT OFFICE 1,959,511

CEMENTITIOUS CONDUIT

Frederick M. Venzie, Philadelphia, Pa.

Application August 4, 1931, Serial No. 554,985

3 Claims. (Cl. 72—51)

This invention, stated in its broadest terms, relates to a cementitious conduit and has more particular relation to the conduit described in my application Serial No. 143,091, filed October 21, 1926.

The leading object of the present invention is that of providing a cementitious conduit which may be manufactured at comparatively little cost and in which the ends of the conduit units may be efficiently tied or coupled together.

A further object of the present invention is to provide a conduit of the character stated in which there is provided at each end of a conduit unit extensions arranged to be overlapped one with respect to the other to form a continuous annular connection.

A still further object of the present invention is to provide a conduit of the character stated in which the adjacent or overlapping extensions aforesaid are each annularly provided with recesses to receive a cementitious sealing material whereby the extension ends of the conduit units may be effectively sealed one with respect to the other.

A still further object of the present invention is to provide a conduit of the character stated in which one of the conduit units is provided with an apertured portion to receive a cementitious fill for sealing one conduit with respect to the other.

A still further object of the present invention is to provide a conduit of the character stated in which each unit is provided with a recessed portion whereby when the units are arranged in opposed position and tie wires for coupling together adjacent units are employed the same may be accommodated by the said recessed portions.

Other and further objects of the invention reside in the providing of general details of construction and arrangement and combination of parts for attaining the results sought by the foregoing objects.

The invention consists of the novel construction hereinafter described and finally claimed.

The nature, characteristic features and scope of the invention will be more fully understood from the following description taken in connection with the accompanying drawing forming part hereof, and in which:

Fig. 1 is a fragmentary view in plan of two units embodying my conduit construction as coupled together;

Fig. 2 is a view in cross-section taken upon the line 2—2 of Fig. 1;

Fig. 3 is a view in cross-section taken upon the line 3—3 of Fig. 1;

Fig. 4 is a fragmentary view in section taken upon the line 4—4 of Fig. 1;

Fig. 5 is a similar view taken upon the line 5—5 of Fig. 1;

Fig. 6 is a fragmentary view in section illustrating a completed end to end construction of conduit units embodying the invention; and Fig. 7 is a view in central section illustrating a conduit unit embodying the present invention and illustrating both the interior and the exterior surfaces thereof as having applied thereto a coating hereinafter described.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring now to the drawing in detail, the reference numeral 10 designates a conduit constructed of cementitious material and of circular cross-section, as shown in Figs. 2 and 3. Each end of a conduit unit 10 is provided with an annular extension 11, the respective annular extensions 11 being arranged to have overlapped relation as best seen in Figs. 5 and 6. Each extension 11 is provided with an annular grooved portion 12, the purpose of which will presently appear. These grooves 12 are arranged in concentric relation with the annular extensions 11, as is clearly shown in Fig. 2. Each unit 10 longitudinally is provided with a reinforcing bar or rod 13, whereby when the adjacent ends of the units 10 are in assembled position the ends of the bars or rods 13 may be twisted together as at 14, see Fig. 5, in order to couple together adjacent units. With the bars or rods 13 twisted together a deposit of cementitious material 15, see Fig. 6, is introduced within the cut out portion or opening 20 to cover the twisted ends of said wires at 14. Cementitious material is then introduced through opening 16 and seeps around through the juxtaposed grooves 12, thereby effecting a bond between the overlapped extensions 11 of the conduit units, as is clearly illustrated in Fig. 6.

As shown in Fig. 7, I may apply interiorly to each unit 10 an application of hot liquid which when cooled forms a metal-like coating 17. If desired I may also apply exteriorly of each unit 10 a similar liquid to form a metal-like coating 18. The purpose of these coatings is to prevent absorption of moisture. Obviously either one of the coatings just described may be omitted if desired.

The conduit is provided with a cage-like reinforce comprised of longitudinal wires 13 and lateral wires 19 arranged concentrically with respect to the conduit. This cage-like reinforce serves to maintain the conduit in form. Thus, when the juxtaposed ends of the longitudinal wires are twisted together and the cementitious material seeps around the annular recess and the filling is introduced around the twisted wires a very efficient, simple, and inexpensive conduit construction is provided.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

What is claimed is:

1. As a new article of manufacture, a tubular cementitious conduit the ends of which are provided with extensions having continuous annular recessed portions including a pouring opening to receive a cementitious fill, each conduit having a peripherally recessed portion to accommodate a tie-wire connection, longitudinal spaced wires co-extensive with each conduit, the adjacent ends of said wires being twisted together at their junctures within said annular recessed portion, and a cementitious fill for said recessed portion, which fill is of arcuate cross section to entirely conceal said tie-wire connections.

2. As a new article of manufacture, a tubular cementitious conduit the ends of which are provided with extensions having continuous annular recessed portions including a pouring opening to receive a cementitious fill, each conduit having a peripherally recessed portion to accommodate a tie-wire connection, longitudinal spaced wires co-extensive with each conduit, the adjacent ends of said wires being inclined upwardly at their inner, opposed terminals and being twisted together at their junctures within said annular recessed portion, and a cementitious fill for said recessed portion, which fill is of arcuate cross-section to entirely conceal said tie-wire connection.

3. In combination a plurality of tubular cementitious conduits each having flanges at opposite ends provided with a circumferential recess, the recesses in adjacent ends of adjoining conduits complementarily fitting each other, means for inserting a cementitious fill in said recesses, metal reinforcements extending lengthwise through each conduit the ends thereof extending beyond the ends of the conduit sections whereby said conduits may be connected by interengagement of the ends of the reinforcements, and a recess adjacent the ends of each conduit within which the interengaged reinforcements will lie.

FREDERICK M. VENZIE.